Nov. 15, 1949     J. A. REYNIERS     2,487,982

FILM HOLDER

Filed Aug. 1, 1945

JAMES A. REYNIERS.
INVENTOR.

BY Oltsch & Knoblock

ATTORNEYS.

Patented Nov. 15, 1949

2,487,982

UNITED STATES PATENT OFFICE 2,487,982

FILM HOLDER

James A. Reyniers, Niles, Mich.

Application August 1, 1945, Serial No. 608,278

2 Claims. (Cl. 95—66)

1

This invention relates to improvements in film holders, and more particularly to a film holder for carrying flat film.

The film holders which are now on the market fall generally into two classes: Those which are compact and of minimum size but are quite expensive, and inexpensive holders which are objectionally large and bulky. It is, therefore, the primary object of my invention to provide a film holder which is simple in construction, inexpensive, of minimum thickness or size, and of light weight.

A further object is to provide a film holder which is of simple construction to facilitate its ready formation from plastic or like materials, as by molding.

A further object is to provide a film holder which may be used for mounting flat film bearing micro images for the dual purpose of permitting exposure of the film and for mounting an exposed film for projection of the images thereon.

This application is a continuation in part of my abandoned application, Serial No. 439,991, filed April 22, 1942.

Other objects will be apparent from the description, drawing and appended claims.

Figure 1:
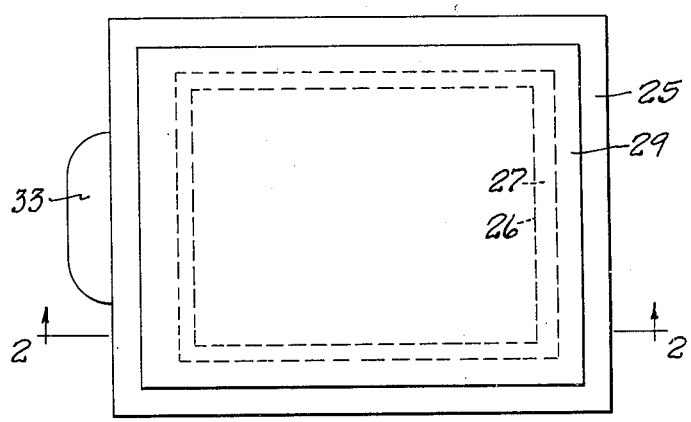
Fig. 1 is a rear face view of my invention.
Figure 2:
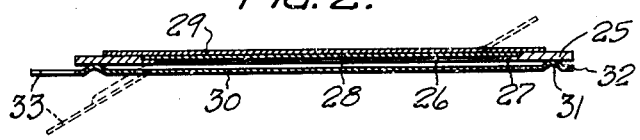
Fig. 2 is a longitudinal sectional view taken on line 2—2 of Fig. 1.

Referring to the drawing, which illustrates the preferred embodiment of the invention, the numeral 25 designates a rectangular frame formed from flat stock, such as a flat stiff or rigid sheet of plastic material such as cellulose acetate, which is provided with a rectangular sight opening 26. At its inner margin the frame 25 is provided with a reduced thickness portion 27 upon which the margins of a film 28 may rest. A flexible sheet of opaque material 29 bears against the back of a film 28 and is preferably adhered to the inner margin of the frame 25. For this purpose, a non-hardening cement or adhesive of the type which is caused to releasably adhere by application of pressure, such as that used on so-called "Scotch Tape" is preferred. It will be seen that the film 28 is inserted in the film holder from the back thereof before the sheet 29 is applied, and that after the sheet 29 is applied the film is firmly but removably mounted in the holder.

2

A light shield 30 of opaque material is preferably provided with a narrow marginal offset 31, to which is applied an adhesive material of the same type above described, whereby the shield 30 may be caused to adhere to the front face of the frame, while lying in a plane laterally spaced from the front face of the frame. Marginal flanges 32 are carried by the shield 30 outwardly of offsets 31 and are also positioned in spaced relation to frame 25. A suitable tab 33 may be provided at one end of the shield 30 to facilitate removal of the shield from the frame. The marginal offset flanges 32 of the shield constitute means which may be engaged by suitable means within the camera itself for stripping the shield 30 from the film holder as the film holder is passed into the camera, and for pressing the shield against the frame as the holder is removed from the camera.

After a film carried by this holder has been exposed, it may be removed from the holder to permit development thereof by simply removing the backing sheet 29. Then the developed film 28 may be reapplied to the frame 25 and marginally cemented thereto by the use of any suitable permanent adhesive. For example, if the film holder 25 is formed from a plastic substantially the same as that of which the film itself is formed, a solvent for this plastic, such as an ester, a ketone, an alcohol or an ether, may be used to soften and partially dissolve the contacting portions of the frame and the film, and then heated to drive off the volatile constituents of the solvent, whereupon the film and the frame will permanently fuse. Thus, the film is thereafter marginally supported, protected and retained by the frame 25 and may be easily and conveniently handled. Thus, the frame 25 will hold the exposed film rigidly or stiffly in flat form, will permit filing of the films in a card file without danger of contact of the film with adjacent films in the file, and at the same time the overall thickness of the unit is maintained at a minimum consistent with compact storage thereof.

It is also understood that the film 28 may be permanently adhered or fused to the frame 25 before it has been exposed, as well as after it has been developed. Thus, if the fusing adhesive above mentioned is employed to interconnect the film and the frame before exposure of the film, handling of the film during the developing processes is simplified.

Figure 3:
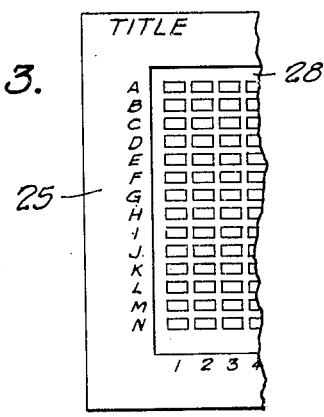
Fig. 3 is a fragmentary face view of the film holder illustrated.
Figure 4:
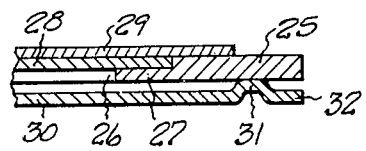
Fig. 4 is an enlarged fragmentary sectional detail view similar to Fig. 2.

Another advantage which is possessed by the film holder is illustrated in Fig. 3 is that the frame may be provided with indicia along its abscissa and ordinate by means of which each individual micro image upon the film may be identified. Thus, if these indicia are properly located, it will be possible for the user to select any given micro image on the film without being required to view each image as by projecting the image on the screen. In addition to this indicia, other indicia referring to title and to code may also be applied to the margin of the frame. One method of utilizing the ordinate and abscissa indicia and providing title material is illustrated in Fig. 4.

It will be seen that this invention possesses the advantages of light weight, small size, simplicity, moldability, and cheapness. The holder is particularly advantageous for use in multiple position cameras, such as cameras having cross slide members for exposing multiple micro images upon a film.

I claim:

1. A film holder comprising a thin frame adapted to receive a film positioned between the planes of the opposite faces thereof, an integral reduced thickness rib projecting inwardly from said frame for engagement with the margin of a film, a pair of imperforate flexible opaque backing sheets spanning opposite faces of said frame to extend over said film, and a non-setting adhesive detachably continuously securing the margins of said sheets to said frame, one of said sheets having a marginal outwardly off-set flange spaced from said frame.

2. A film holder comprising a thin frame adapted to receive a film positioned between the planes of the opposite faces thereof, an integral reduced thickness rib projecting inwardly from said frame for engagement with the margin of a film, a pair of imperforate flexible opaque backing sheets spanning opposite faces of said frame and covering said film, and a non-setting adhesive detachably and continuously securing the margins of said sheets to said frame, one of said sheets having a continuous perimetrical inwardly projecting off-set spaced inwardly from its edges and adhered to said frame at its convex surface whereby the margin thereof is spaced from said frame and its inner portion is spaced from said film and said frame.

JAMES A. REYNIERS.

REFERENCES CITED

The following references are of record in the file of this patent:

UNITED STATES PATENTS

| Number | Name | Date |
|---|---|---|
| 1,467,108 | Hodgson | Sept. 4, 1923 |
| 1,500,025 | Mayer | July 1, 1924 |
| 1,567,310 | Weeks | Dec. 29, 1925 |
| 1,727,349 | Lyman | Sept. 10, 1929 |
| 1,904,318 | Lehere | Apr. 18, 1933 |
| 2,099,976 | Hagedorn | Nov. 23, 1937 |
| 2,168,418 | Lukis | Aug. 8, 1939 |
| 2,227,973 | Hood | Jan. 7, 1941 |
| 2,256,399 | MacHarg | Sept. 16, 1941 |
| 2,284,776 | Stuart | June 2, 1942 |
| 2,291,173 | Simpson | July 28, 1942 |
| 2,362,434 | Fitch et al. | Nov. 7, 1944 |